US010505982B2

(12) United States Patent
Motukuru et al.

(10) Patent No.: US 10,505,982 B2
(45) Date of Patent: Dec. 10, 2019

(54) MANAGING SECURITY AGENTS IN A DISTRIBUTED ENVIRONMENT

(71) Applicant: Oracle International Corporation, Redwood Shores, CA (US)

(72) Inventors: Vamsi Motukuru, Monmouth Junction, NJ (US); Ashish Kolli, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 15/331,211

(22) Filed: Oct. 21, 2016

(65) Prior Publication Data
US 2017/0118249 A1  Apr. 27, 2017

Related U.S. Application Data

(60) Provisional application No. 62/245,801, filed on Oct. 23, 2015.

(51) Int. Cl.
*H04L 29/06* (2006.01)
*H04L 12/46* (2006.01)

(52) U.S. Cl.
CPC .......... *H04L 63/20* (2013.01); *H04L 12/4641* (2013.01); *H04L 63/08* (2013.01); *H04L 63/102* (2013.01); *H04L 63/0272* (2013.01)

(58) Field of Classification Search
CPC ... H04L 63/20; H04L 63/0853; H04L 63/102; H04L 63/08; H04L 12/4641; H04L 63/0272
See application file for complete search history.

(56) References Cited

U.S. PATENT DOCUMENTS 6,041,357 A   3/2000  Kunzelman et al.
6,055,637 A   4/2000  Hudson et al.
(Continued)

FOREIGN PATENT DOCUMENTS

EP     1864240        12/2007
WO    2013049461       4/2013
(Continued)

OTHER PUBLICATIONS

BIG-IP Access Policy Manager, http://www.f5.com/pdf/products/big-ip-access-policy-manager-ds.pdf, (copyright 2013).
(Continued)

*Primary Examiner* — Cheng-Feng Huang
(74) *Attorney, Agent, or Firm* — Kilpatrick Townsend & Stockton LLP

(57) ABSTRACT

The present disclosure relates generally to techniques for controlling access to resources accessible in a distributed environment. One of the techniques includes connecting a security agent to a policy server through a default port using a default protocol. The security agent is configured to intercept requests for access to a resource in a distributed environment, and work with the policy server to control access to the resource based on policies stored on the policy server. The technique further includes obtaining a configuration file from the policy server such that the security agent can initialize and determine the distributed environment in which the security agent resides, analyzing ports of communication within the distributed environment to identify a preferred port that is available for connection to the policy server, and connecting to the policy server through the preferred port to access the policies for controlling the access to the resource.

16 Claims, 9 Drawing Sheets

(56) References Cited

U.S. PATENT DOCUMENTS

| | | | |
|---|---|---|---|
| 6,076,108 | A | 6/2000 | Courts et al. |
| 6,178,511 | B1 | 1/2001 | Cohen et al. |
| 6,338,064 | B1 | 1/2002 | Ault et al. |
| 6,385,724 | B1 | 5/2002 | Beckman et al. |
| 6,811,873 | B2 | 11/2004 | Nadkarni |
| 7,100,195 | B1 | 8/2006 | Underwood |
| 7,137,006 | B1 | 11/2006 | Grandcolas et al. |
| 7,225,256 | B2 | 5/2007 | Villavicencio |
| 7,296,290 | B2 | 11/2007 | Barriga et al. |
| 7,426,642 | B2 | 9/2008 | Aupperle et al. |
| 7,437,594 | B1 | 10/2008 | Mount et al. |
| 7,496,953 | B2 | 2/2009 | Andreev et al. |
| 7,747,746 | B2 | 6/2010 | Thayer et al. |
| 7,761,911 | B2 | 7/2010 | Song |
| 7,805,529 | B2 | 9/2010 | Galluzzo et al. |
| 7,818,582 | B2 | 10/2010 | Marion et al. |
| 7,886,000 | B1 | 2/2011 | Polis et al. |
| 7,908,380 | B1 | 3/2011 | Chu et al. |
| 7,996,376 | B2 | 8/2011 | Singh et al. |
| 8,001,232 | B1 | 8/2011 | Saulpaugh et al. |
| 8,073,954 | B1 | 12/2011 | Tu et al. |
| 8,117,649 | B2 | 2/2012 | Hardt |
| 8,244,907 | B2 | 8/2012 | Hinton et al. |
| 8,365,266 | B2 | 1/2013 | Bogner |
| 8,438,635 | B2 | 5/2013 | Das et al. |
| 8,442,943 | B2 | 5/2013 | Multer et al. |
| 8,468,586 | B2 | 6/2013 | Koottayi et al. |
| 8,495,195 | B1 | 7/2013 | Abidogun et al. |
| 8,544,069 | B1 | 9/2013 | Subbiah et al. |
| 8,627,435 | B2 | 1/2014 | Sirota |
| 8,650,305 | B2 | 2/2014 | Booth et al. |
| 8,756,704 | B2 | 6/2014 | Castellucci et al. |
| 8,819,444 | B2 | 8/2014 | Shahbazi et al. |
| 8,843,997 | B1 | 9/2014 | Hare |
| 8,898,765 | B2 | 11/2014 | Goyal et al. |
| 8,955,037 | B2 | 2/2015 | Srinivasan et al. |
| 9,083,690 | B2 | 7/2015 | Subramanya et al. |
| 9,104,451 | B2 | 8/2015 | Subramanya et al. |
| 9,247,006 | B2 | 1/2016 | Mathew et al. |
| 9,544,293 | B2 | 1/2017 | Mathew et al. |
| 9,900,224 | B2* | 2/2018 | Dumitriu ............ H04L 12/4625 |
| 2002/0029269 | A1 | 3/2002 | McCarty et al. |
| 2002/0078365 | A1 | 6/2002 | Burnett et al. |
| 2003/0212887 | A1 | 11/2003 | Walther et al. |
| 2004/0003259 | A1 | 1/2004 | Chang |
| 2004/0073666 | A1 | 4/2004 | Foster et al. |
| 2004/0260810 | A1* | 12/2004 | Bernoth ............... H04L 63/0236 709/225 |
| 2005/0091655 | A1 | 4/2005 | Probert et al. |
| 2005/0108570 | A1 | 5/2005 | Gopalraj |
| 2005/0120091 | A1 | 6/2005 | Casais et al. |
| 2005/0144482 | A1 | 6/2005 | Anuszewski |
| 2006/0059546 | A1 | 3/2006 | Nester et al. |
| 2006/0218630 | A1 | 9/2006 | Pearson et al. |
| 2006/0236382 | A1 | 10/2006 | Hinton et al. |
| 2006/0277596 | A1 | 12/2006 | Calvert et al. |
| 2007/0147247 | A1 | 6/2007 | Kalonji et al. |
| 2007/0192326 | A1 | 8/2007 | Angal et al. |
| 2008/0294781 | A1 | 11/2008 | Hinton et al. |
| 2009/0037763 | A1 | 2/2009 | Adhya et al. |
| 2010/0131755 | A1 | 5/2010 | Zhu et al. |
| 2010/0146611 | A1 | 6/2010 | Kuzin et al. |
| 2010/0217837 | A1* | 8/2010 | Ansari .................... G06Q 30/04 709/218 |
| 2011/0277019 | A1* | 11/2011 | Pritchard, Jr. ...... H04L 63/0815 726/4 |
| 2012/0078708 | A1 | 3/2012 | Taylor et al. |
| 2012/0191842 | A1 | 7/2012 | Hu et al. |
| 2012/0254949 | A1 | 10/2012 | Mikkonen et al. |
| 2012/0254957 | A1 | 10/2012 | Fork et al. |
| 2012/0266229 | A1 | 10/2012 | Simone et al. |
| 2012/0291090 | A1 | 11/2012 | Srinivasan et al. |
| 2013/0036454 | A1 | 2/2013 | Purvis et al. |
| 2013/0073670 | A1 | 3/2013 | Das et al. |
| 2013/0081130 | A1* | 3/2013 | Huba .................... H04L 67/16 726/11 |
| 2013/0185449 | A1* | 7/2013 | Brzozowski ...... H04L 29/12358 709/230 |
| 2013/0198818 | A1 | 8/2013 | Hitchcock et al. |
| 2014/0259109 | A1* | 9/2014 | Houston ................ H04L 63/10 726/3 |
| 2014/0344326 | A1 | 11/2014 | Kamath et al. |
| 2015/0059003 | A1* | 2/2015 | Bouse ................ G06F 16/2228 726/28 |
| 2015/0088978 | A1 | 3/2015 | Motukuru et al. |
| 2015/0089569 | A1 | 3/2015 | Sondhi et al. |
| 2015/0089570 | A1 | 3/2015 | Sondhi et al. |
| 2015/0089571 | A1 | 3/2015 | Srinivasan et al. |
| 2015/0089579 | A1 | 3/2015 | Manza et al. |
| 2015/0089580 | A1 | 3/2015 | Manza et al. |
| 2015/0089596 | A1 | 3/2015 | Sondhi et al. |
| 2015/0089597 | A1 | 3/2015 | Srinivasan et al. |
| 2015/0089604 | A1 | 3/2015 | Mathew et al. |
| 2015/0089614 | A1 | 3/2015 | Mathew et al. |
| 2015/0089617 | A1 | 3/2015 | Sondhi et al. |
| 2015/0089619 | A1 | 3/2015 | Manza et al. |
| 2015/0089620 | A1 | 3/2015 | Manza et al. |
| 2015/0089622 | A1 | 3/2015 | Sondhi et al. |
| 2015/0089623 | A1 | 3/2015 | Sondhi et al. |
| 2016/0004870 | A1* | 1/2016 | Forte .................... H04L 63/20 706/12 |
| 2016/0219040 | A1 | 7/2016 | Mathew et al. |
| 2016/0248758 | A1 | 8/2016 | Mathew et al. |
| 2016/0294607 | A1* | 10/2016 | Davis .................. H04L 12/4641 |
| 2016/0381000 | A1 | 12/2016 | Mathew et al. |
| 2017/0034152 | A1 | 2/2017 | Subramanya et al. |

FOREIGN PATENT DOCUMENTS

| | | |
|---|---|---|
| WO | 2015042546 | 3/2015 |
| WO | 2015042547 | 3/2015 |

OTHER PUBLICATIONS

"IBM Security Access Manager for Enterprise Single Sign-On", Available online at: http://www-03.ibm.com/software/products/en/access-mgr-esso, Nov. 10, 2016.

Impersonate another user: Dynamics CRM 2015. Copyright 2015 Microsoft [retrieved Jun. 25, 2015]. Retrieved from the Internet: <URL: https://msdn.microsoft.com/en-us/library/gg334744.aspx>, 1 page.

Implementing Single Sign-on Across Multiple Organizations, Developer.force.com, http://wiki.developerforce.com/page/Implementing_Single_Sign-On_Across_Multiple_Organizations; Accessed on Dec. 19, 2013.

Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/ search.do?language=en_US&cmd=displayKC&externalId=2034074>, 2 pages.

Multiple Data Centers. support.ca.com [online]. Copyright 2014 CA [retrieved Jan. 7, 2015]. Retrieved from the Internet: <URL: https://support.ca.com/cadocs/ 0/CA%20SiteMinder%2012%2052%20SP1-ENU/Bookshelf_Files/HTML/idocs/ index.htm?toc.htm?706393.html?intcmp=searchresultclick&resultnum=452>, 8 pages.

Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.

Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301>, 6 pages.

Oracle Fusion Middleware Performance and Tuning for Oracle WebLogic Server: Tuning Web Applications. Copyright 2015 Oracle

(56) References Cited

OTHER PUBLICATIONS

[retrieved May 18, 2015]. Retrieved from the Internet: <URL: http://docs.oracle.com/cd/E12839_01/web.1111/e13814/webapptune.htm#PERFM368>, 3 pages.
"The art of logging out", Available online at: https:://www.kth.se/social/group/cas/page/the-art-of-logging-out, Retrieved Apr. 26, 2013, 2 pages.
"User Session Monitoring for CA Single Sign-On", Available online at: https://www.ca.com/content/dam/ca/us/files/service-offering/user-session-monitor-for-ca-single-sign-on.pdf, Published 2015, 1 page.
U.S. Appl. No. 14/135,053 , Final Office Action dated Jul. 6, 2015, 17 pages.
U.S. Appl. No. 14/135,053 , Non-Final Office Action dated Jan. 29, 2015, 16 pages.
U.S. Appl. No. 14/135,053 , Non-Final Office Action dated Nov. 25, 2015, 18 pages.
U.S. Appl. No. 14/135,053 , Notice of Allowance, dated May 20, 2016, 10 pages.
U.S. Appl. No. 14/135,053, Notice of Allowance, dated Aug. 31, 2016, 9 pages.
U.S. Appl. No. 14/137,775 , Non-Final Office Action dated May 22, 2015, 10 pages.
U.S. Appl. No. 14/137,775 , Notice of Allowance dated Sep. 16, 2015, 9 pages.
U.S. Appl. No. 14/491,076, Non-Office Action dated Mar. 11, 2016, 13 pages.
U.S. Appl. No. 14/491,076, Final Office Action dated Oct. 25, 2016, 18 pages.
U.S. Appl. No. 14/491,076, Final Office Action dated Oct. 6, 2016, 19 pages.
U.S. Appl. No. 15/005,365, Non-Final Office Action dated Aug. 24, 2016, 11 pages.
U.S. Appl. No. 14/754,222, Non-Final Office Action, dated Dec. 1, 2016, 10 pages.
U.S. Appl. No. 14/814,209 , "Final Office Action", dated Jul. 31, 2017, 19 pages.
U.S. Appl. No. 14/814,209, "Non-Final Office Action", dated Jan. 11, 2017, 13 pages.
U.S. Appl. No. 15/005,365, "Final Office Action", dated Mar. 10, 2017, 12 pages.
U.S. Appl. No. 61/880,335, mailed on Sep. 20, 2013.
U.S. Appl. No. 61/880,400, mailed on Sep. 20, 2013.
U.S. Appl. No. 61/880,569, mailed on Sep. 20, 2013.
U.S. Appl. No. 61/880,598, mailed on Sep. 20, 2013.
Ferguson et al., "Session management server: Session transitions and state", Retrieved from the Internet: http://www.ibm.com/developerworks/tivoli/library/t-sms-states/, Jun. 25, 2007, 7 pages.
Gaur, "IBM Extreme Transaction Processing (XTP) Patterns: Scalable and robust HTTP session management with WebSphere eXtreme Scale", Retrieved from the Internet:http://www.ibm.com/developerworks/websphere/library/techarticles/0905_gaur/0905_gaur.html, May 27, 2009, 8 pages.
Haire, "A Solution to SSO Authentication and Identity Management: Lessons Learned", Atlassian Blog, May 16, 2013, 5 pages.
Jive Software, "Understanding Jive Mobile's SSO Compliance", Available online at: https://community.jivesoftware.com/docs/DOC-61829, Jun. 25, 2012, 11 pages.
Mortimore et al., "Implementing Single Sign-On Across Multiple Organizations", Retrieved from the Internet: https://developer.salesforce.com/page!Implementing_Single_Sign-On_Across_Multiple_Organizations, 2000-2014, 15 pages.
Murdoch, "Hardened stateless session cookies", In International Workshop on Security Protocols, Springer Berlin Heidelberg, Apr. 2008, pp. 1-9.
Rivard, J. Clearing Novell Access Manager Application Sessions. Jan. 26, 2009, NetIQ [retrieved Jun. 13, 2016]. Retrieved from the Internet: <URL: https://www.netiq.com/communities/cool-solutions/clearing-novell-access-manager-application-sessions/>, 4 pages.
Stirpe et al., "Time-out Management in Multi-domain Single Sign-On", Retrieved from the Internet: <URL: http://www.strattagroup.com/tsg/pubs/ssotime-out.pdf, 2005, 13 pages.
Volodarsky, M. ASP.NET: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.
Ye, W. A complete Impersonation Demo in C#.NET. Jun. 20, 2013, Code Project [retrieved on Jun. 25, 2015]. Retrieved from the Internet: <URL: http://www.codeproject.com/Articles/125810/A-complete-Impersonation-Demo-in-Csharp-NET>, 12 pages.
Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.
IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.
Symantec Identify: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.
"Final Office Action" issued in U.S. Appl. No. 14/814,209, dated Jan. 4, 2019, 21 pages.
"Non-Final Office Action" issued in U.S. Appl. No. 14/814,209, dated May 14, 2018, 20 pages.
U.S. Appl. No. 14/814,209, Non-Final Office Action dated Aug. 19, 2019, 20 pages.

\* cited by examiner

MANAGING SECURITY AGENTS IN A DISTRIBUTED ENVIRONMENT

CROSS-REFERENCE TO RELATED APPLICATION

The present application is a non-provisional application of, and claims the benefit and priority under 35 U.S.C. 119(e) of U.S. Provisional Application No. 62/245,801, filed Oct. 23, 2015, entitled "MANAGING SECURITY AGENTS IN A DISTRIBUTED ENVIRONMENT," the entire contents of which are incorporated herein by reference for all purposes.

BACKGROUND

The present disclosure relates generally to access control, and more particularly, to techniques (e.g., systems, methods, computer program products storing code or instructions executable by one or more processors) for controlling access to resources accessible in a distributed environment.

A distributed environment such as cloud computing technology delivers computing power and storage capacity as a service to a community of user devices via a network. Application and data are stored on a distributed environment server. A user device accesses the applications and data using a client that stores and executes a browser application.

Enterprises such as companies and government agencies are increasingly faced with the challenge of opening their IT infrastructure to grant customers and partners access to resources such as applications and data stored on a distributed environment server. These enterprises also need to regulate user access to various data, keeping track of who has access to what. Enterprises increasingly rely on identity management solutions to improve application security and usability. However, conventional identity management solutions rely on hard coding each application in a distributed environment with connection and protocol artifacts of an access manager such that the access manager can control access to each application. As such, conventional identity management solutions for accessing applications and data in a distributed environment are static and unable to easily adapt to change in the access manager or distributed environment without modification of the hard coding in each application.

New techniques are desired for controlling access to resources accessible in a distributed environment. Further desired are techniques for enabling identity management solutions to dynamically control access to resources accessible in a distributed environment.

BRIEF SUMMARY

Systems, methods and computer-readable memory for controlling access to resources accessible in a distributed environment are described. Certain techniques are described for provisioning identity management solutions with a security agent to dynamically control access to resources accessible in a distributed environment, and managing the security agent in the distributed environment.

In exemplary embodiments, a method is performed by a security agent within a computing system, and the method includes connecting the security agent to a policy server through a default port using a default protocol. The security agent is configured to work with the policy server to control access to a resource in a distributed environment, the policy server resides outside of the distributed environment, and the policy server includes policies for controlling the access to the resource. The method further includes obtaining a configuration file from the policy server using the default port and the default protocol such that the agent can initialize and determine the distributed environment in which the security agent resides, and analyzing ports of communication within the distributed environment to identify a preferred port that is available for connection to the policy server. The method further includes connecting to the policy server through the preferred port using a corresponding protocol to access the policies for controlling the access to the resource.

In exemplary embodiments, a system is provide for comprising one or more processors and non-transitory machine readable storage medium, a distributed environment that includes a resource, a policy server that includes policies and resides outside of the distributed environment, and a security agent that resides inside the distributed environment, and the security agent is configured to intercept requests for access to the resource from a local application and work with the policy server to control access to the resource. The system further comprises program instructions to connect the security agent to the policy server through a default port using a default protocol, program instructions to obtain a configuration file from the policy server using the default port and the default protocol such that the security agent can initialize and determine the distributed environment in which the security agent is located, program instructions to analyze ports of communication within the distributed environment to identify a preferred port that is available for connection to the policy server, and program instructions to connect the security agent to the policy server through the preferred port using a corresponding protocol to access the policies for controlling the access to the resource. The program instructions are stored on the non-transitory machine readable storage medium for execution by the one or more processors.

In exemplary embodiments, a non-transitory machine readable storage medium is provided for having instructions stored thereon that when executed by one or more processors cause the one or more processors to perform a method comprising analyzing ports of communication within a distributed environment to identify a preferred port that is available for connection from a security agent to a policy server, receiving a request from a user for access to a resource provided in the distributed environment, connecting to the policy server through the preferred port using a corresponding protocol to access policies for controlling the access to the resource, requesting a determination be made by the policy server as to whether authentication of the user is required for access to the resource, wherein the request is sent from the security agent to the policy server via the preferred port, checking the authentication of the user when the authentication of the user is required for access to the resource, requesting a determination be made by the policy server as to whether the user is authorized to access the resource when the authentication of the user is verified, wherein the request is sent from the security agent to the policy server via the preferred port, and allowing the user access to the resource when the user is authorized to access the resource.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of various embodiments described herein. However, it will be apparent that the various embodiments may be practiced without these specific details. The figures and description are not intended to be restrictive.

The present disclosure relates generally to providing single sign-on (SSO) access to resources such as enterprise software in a distributed environment. Certain techniques are disclosed for provisioning and managing a security agent that controls the SSO access to the resources. The security agent uses dynamic channel communication with an access manager server for controlling the SSO access to the resources. For example, the security agent is aware of its context (e.g., provisioned in a distributed environment), and the security agent is configured to use appropriate communication channels based on its context to connect with the access manager server no matter where the access manager server is located (e.g., same domain or remote domain). Once established, the connectivity between the security agent and the access manager server allows for centrally managing security policies in place for the resources, and controlling the SSO access to the resources based on the security policies in a consistent manner.

The various embodiments described herein may be used in an assortment of different domains and contexts. Certain embodiments are particularly applicable to enterprise application software provided in cloud computing technology. However, the systems and methods described herein may be used to provide access control functionality for any system or application framework that relies on an access manager server for controlling access to resources in a distributed environment.

Figure 1:
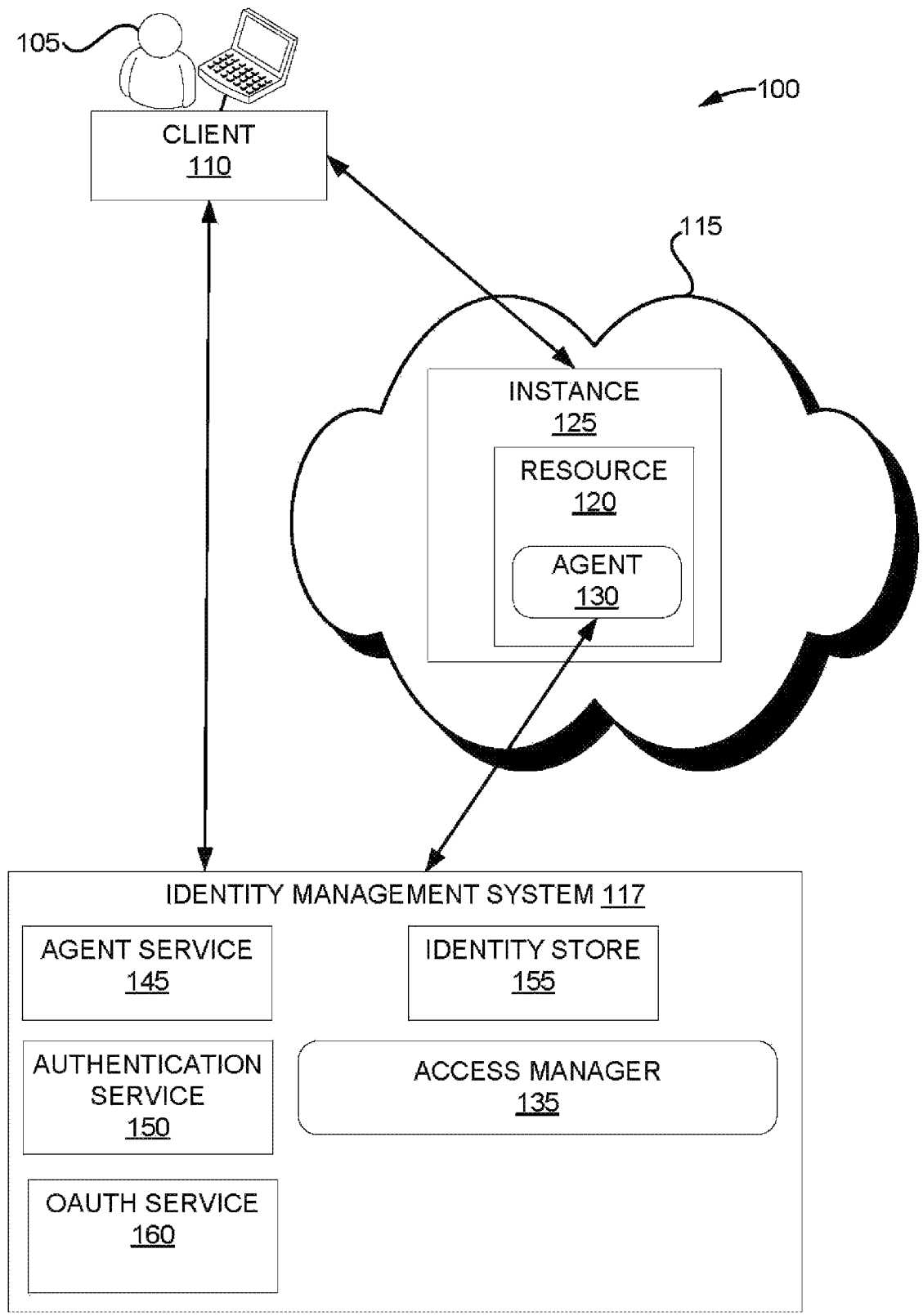
FIG. 1 illustrates a high-level diagram of a system for restricting access to a resource in a distributed environment in accordance with various embodiments.

In some embodiments, systems, methods, and computer-readable media are disclosed for controlling access to resources accessible in a distributed environment. FIG. 1 illustrates a system 100 for managing SSO access to resources in accordance with an exemplary embodiment. Specifically, system 100 provides SSO access among different resources provided within a distributed environment. For example, a user 105 operating a client device 110 may access an enterprise computer network that includes a distributed computing system. The distributed computing system may be implemented using a cloud computing infrastructure. In some embodiments, the distributed computing system may include a distributed environment server 115 (e.g., a cloud server) that delivers computing power and storage capacity as a service to user 105 via the network. Resource 120 (e.g., application and data) is stored on the distributed environment server 115 in an instance 125 that is accessible by the client device 110 via the network. Client device 110 may be a workstation, personal computer (PC), laptop computer, smart phone, wearable computer, or other networked electronic device.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 112 in a SSO system.

An access management system may be implemented in system 100 according to an agent-server model for enabling communication between client device 110, the distributed environment server 115, and an identity management system 117 to provide access control functionality over resource 120. The agent-server model may include an agent component (e.g., security agent 130 also known as a single sign-on agent or policy-enforcement agent) and a server component (e.g., access manager server 135 also known as a single sign-on server or policy server). The security agent 130 may be deployed with the resource 120 as a plugin or as a portion of the resource 120, or the security agent 130 may be provisioned separate from the resource 120, for example, running on a web server in front of the resource 120. The access manager server 135 may be deployed as a part of the identity management system 117. The identity management system may further comprise agent service 145, authentication service 150, identity store 155, and OAuth service 160.

The security agent 130 and the access manager server 135 may work in combination to provide user access control and protect resources within the enterprise computer network against external and internal web-based threats. For example, the access manager server 135 may serve as the decision component for controlling access to the resource 120, and the security agent 130 may implement or operate as the enforcement component for controlling access to the resource 120. In some embodiments, the security agent 130 may be application language binding specific, and thus, the security agent 130 could be used for protecting multiple applications written in the same language and sharing the same endpoints (e.g., uniform resource identifier (URI)).

The access management system enables SSO functionality within a distributed environment, and may perform various access control related functions for managing access to resources within the distributed environment. For example, security agent 130 and access management server 135 may perform authentication of a user (e.g., user 105)

operating a client device (e.g., client device 110). Authentication is a process by which a user is verified to determine that he/she is who he/she claims to be. To authenticate a user, an access management system (e.g., using security agent 130 and access management server 135) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like). The access management server 135 may determine authorization of a user to access a resource (e.g., resource 120). Authorization is the process of determining if a user has a right to access a requested resource. Authorization policies may be defined that specify the conditions under which a user or group of users has access to a resource. For example, an administrator may only authorize certain users within a group to access particular resources.

Communication between the security agent 130 and access manager server 135 may be split between dynamic channels of communication. The dynamic channels of communication can be determined and changed by the security agent 130 in order to communicate outside of the distributed computing system with the identify management system 117. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by the security agent 130 and access manager server 135. In some embodiments, each channel may communicate using an access token designed for the type of communication over the channel. Either or both communication channels may be used to retrieve security policies including authentication and authorization policies for SSO access to resource 120 on distributed environment server 115. The access flow may generate one or more types of access tokens. A first token may be an access management ID token, which serves the SSO requests that are being propagated over HTTP. A second token may be an authorization token that may be used to service the SSO requests that are being propagated over OAP. The access tokens may be stored as cookies. Advantageously, the agents ability to determine and use dynamic channels of communication avoids hard coding the connection and protocol artifacts of the access manager server 135 into the security agent 130, and allows for the agent 315 to easily adapt to change in the access manager server 315 or distributed environment without modification of the hard coding.

FIG. 1 further illustrates an example of a SSO session managed within a distributed environment implementing an access management system comprising security agent 130 and access management server 135. For example, user 105 may operate client device 110 to request access to resource 130 controlled by distributed environment server 115. The request may be routed to or intercepted by security agent 130, which controls access to resource 130. In some embodiments, some resources managed by the security agent 130 may not protected, in which case security agent 130 may query the access manager server 135 to determine if the requested resource is protected. The access manager server 135 checks relevant authentication policies for the resource 130 to determine whether authentication is required for access to the resource 130. If the requested resource 130 is protected and requires authentication for use, the access manager server 135 may determine whether any session exists for user 105. Upon determining that no session has been established for user 105, the user 105 may be forwarded by the access manager server 135 to a login service (e.g., authentication service 150) of the identity management system 117. The authentication service 150 may request authentication credentials (e.g., user name/password, or the like) from user 105. The authentication service 150 may authenticate the user 105 upon receiving the proper authentication credentials by validating the credentials against those stored in a user directory or identity store 155.

Based on receiving the proper authentication credentials for user 105, the access manager server 135 may forward the user 105 back to the security agent 130, the security agent 130 may check the authentication, and establish a first session for user 105 upon authentication of user 105. As a result, user 105 is logged into the distributed environment server 115 for the session. Once logged in, user 105 may access resources to which the user is authorized to access, such as running different applications, accessing cloud storage, or the like. Once user 105 is logged into the distributed environment server 115, the access manager server 135 creates a cookie that tracks session activity for user 105. The cookie may include a length of time that the user 105 has been active on a session. The cookie may be stored as session activity data within the identity management system 117.

Upon determining that user 105 is authenticated for a SSO session, security agent 130 may process the original request for resource 120 by directing an authorization query to the access manager server 135. The access manager server 135 checks relevant authorization policies for the resource 130 to determine whether the user 105 is authorized to access to the resource 120. The access manager server 135 responds to the security agent 130 with an allow or deny message based on the authorization policies. Upon determining that the user 105 is allowed access to the resource 120, the security agent 130 allows the request from the client device 110 for access to the resource 120 to go through and the user 105 can access the resource 120 on the distributed environment server 155 via client device 110. Upon determining that the user 105 is denied access to the resource 120, the security agent 130 notifies the client 110 that access to the resource 120 for the user 105 is not permitted.

FIGS. 2-6 illustrate processes and operations for provisioning and utilizing an access management system that enables SSO functionality within a distributed environment according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 2-6 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2-6 is not intended to be limiting. Other sequences of steps may also be performed according to alternative embodiments. For example, in alternative embodiments the steps outlined above may be performed in a different order. Moreover, the individual steps illustrated in FIGS. 2-6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
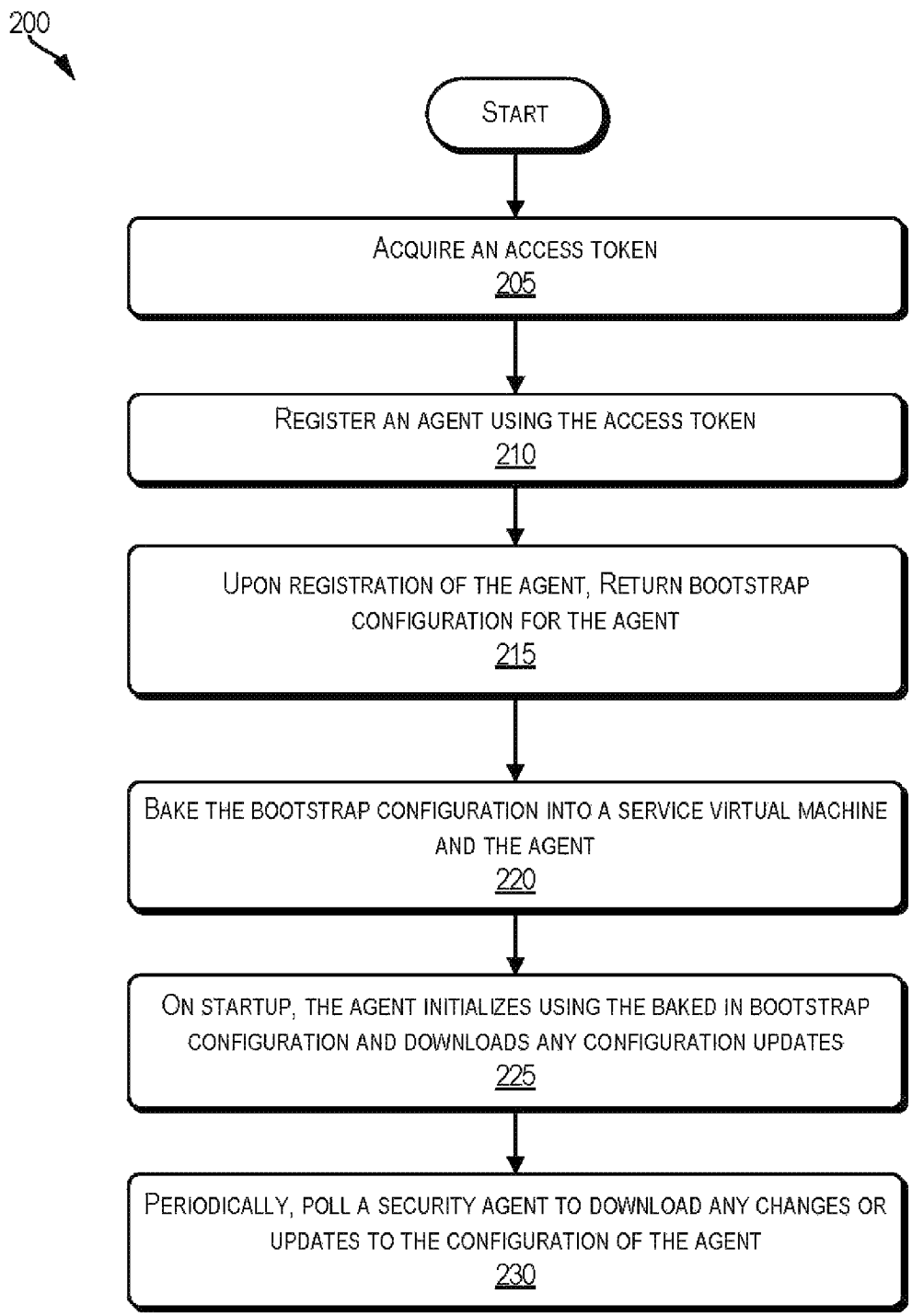
FIG. 2 depicts a flowchart illustrating a process for infrastructure driven provisioning of an access management system in accordance with various embodiments.

FIG. 2 shows a flowchart 200 that illustrates a process for infrastructure driven provisioning of an access management system according to various embodiments. In some embodiments, the processes depicted in flowchart 200 may be implemented by the identity management system 117 and the security agent 130 of FIG. 1.

At step 205, a provisioning infrastructure (e.g., the identity management system 117 of FIG. 1) acquires an access token from an authorization service (e.g., OAuth service 160 of FIG. 1) for access to an agent (e.g., security agent 130 of FIG. 1) within a distributed environment. Access tokens are used to grant access to specific resources in an HTTP service for a specific period of time (for example, the security agent 130 as described with respect to FIG. 1). This enables the provisioning infrastructure access to the agent. The access token can be sent to the provisioning infrastructure to access the agent. The access token is a string that denotes a specific scope, lifetime, and other access attributes. At step 210, the provisioning infrastructure registers the agent with an access manager (e.g., access manager 135 of FIG. 1) using the access token to set up a trust mechanism between the agent and the provisioning infrastructure or identity management system. Registered agents delegate authentication tasks to the identity management system.

At step 215, upon the agent being registered, a bootstrap configuration for initializing or starting up the agent is packaged in a file (e.g., a zip file) by the access manager and returned to the provisioning infrastructure. In some embodiments, the access manager is creating the agent binaries on the fly with dynamically generated security information (e.g., keys, certificates) that allows the agent to subsequently connect to the provisioning infrastructure in a secure manner. At step 220, the provisioning infrastructure connects with the agent using the trust mechanism between the agent and the provisioning infrastructure, and bakes or hard codes the returned file with the security information into the agent and/or a service virtual machine. In some embodiments, the security information is baked into the dynamically generated agent binaries and/or a service virtual machine (e.g., the gent may be a part of a business application or service, which is deployed as a virtual vachine) At step 225, on startup of the platform or environment in which the agent resides (e.g., Windows, Linux, Mac, etc.), the agent initializes using artifacts from the baked in file, connects to the provisioning infrastructure through a standard or default port, and downloads a configuration file from a security agent service (e.g., agent service 145 of FIG. 1) to update the agent's configuration automatically. At step 230, periodically, the agent polls the security agent service to download any changes or updates to the configuration of the agent.

In some embodiments, the bootstrap configuration, metadata, configuration file, and changes or updates to the configuration of the agent are managed by the provisioning infrastructure. The agent is configured to stop working in an instance that the agent is unable to poll or sync with the security agent service. In other embodiments, the changes or updates to the configuration of the agent may be pushed to the agent from the security agent service.

Figure 3:
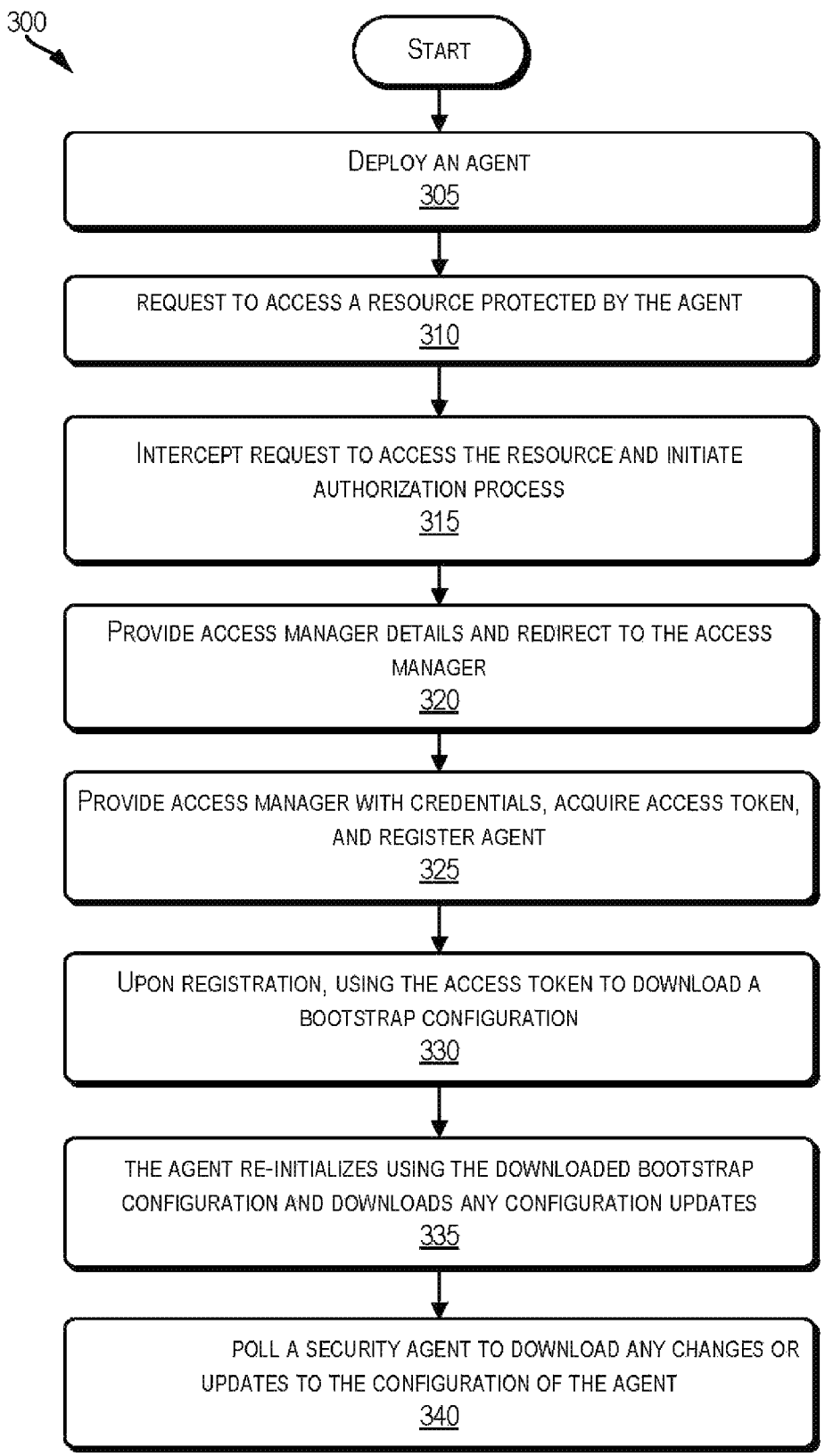
FIG. 3 depicts a flowchart illustrating a process for user driven provisioning of an access management system in accordance with various embodiments.

FIG. 3 shows a flowchart 300 that illustrates a process for user driven provisioning (e.g., bootstrapping) of an access management system according to various embodiments. In some embodiments, the processes depicted in flowchart 300 may be implemented by the client device 110, the identity management system 117, and the security agent 130 of FIG. 1.

At step 305, an agent is deployed (e.g., baked or hard coded into an application container or a web server) in a dormant state with coordinates used to establish a secure communication in subsequent steps. In some embodiments, the coordinates include an identifier (e.g., an immutable agent identifier), a URI of an access manager, and secure sockets layer (SSL) fingerprints (e.g., an identifier of a public key). At step 310, an administrator launches a browser and attempts to access a resource such as an application in a distributed environment that is protected by the agent (e.g., security agent 130 of FIG. 1). At step 315, the agent intercepts the request and forwards the request to a configuration page that initiates an authorization process to access the access manager (e.g., access manager server 135 of FIG. 1). At step 320, the administrator provides details of the access manager and is redirected to the access manager for agent registration. At step 325, the administrator provides the access manager with administrator credentials, acquires an access token from an authorization service (e.g., OAuth service 160 of FIG. 1), and registers the agent with an access manager (e.g., access manager 135 of FIG. 1) using the access token to set up a trust mechanism between the agent and an identity management system (e.g., the identity management system 117 of FIG. 1). Registered agents delegate authentication tasks to the identity management system. At step 330, upon the agent being registered, the agent uses the trust mechanism between the agent and the identity management system to download a bootstrap configuration for initializing or booting up the agent from the access manager. At step 335, the agent re-initializes using artifacts from the downloaded bootstrap configuration, connects to the identity management system through a standard or default port, and downloads a configuration file from a security agent service (e.g., agent service 145 of FIG. 1) to configure the agent. At step 340, periodically, the agent polls the security agent service to download any changes or updates to the configuration of the agent.

In some embodiments, the bootstrap configuration, metadata, configuration file, and changes or updates to the configuration of the agent are managed by the provisioning infrastructure. The agent is configured to stop working in an instance that the agent is unable to poll or sync with the security agent service. In other embodiments, the changes or updates to the configuration of the agent may be pushed to the agent from the security agent service.

Figure 4:
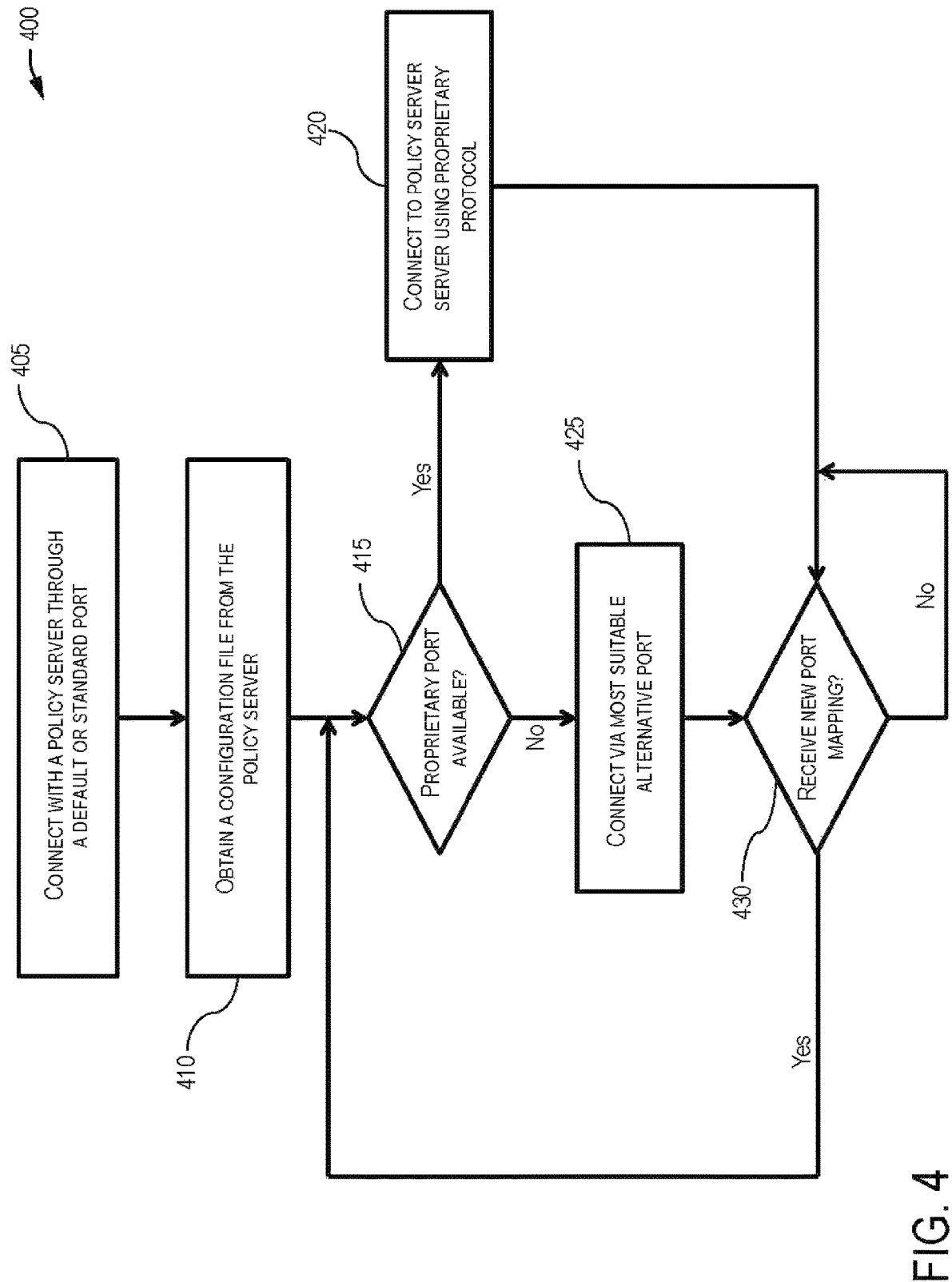
FIG. 4 depicts a flowchart illustrating a process for establishing dynamic channel communication in accordance with various embodiments.

FIG. 4 shows a flowchart 400 that illustrates a process for an agent (e.g., security agent 130 of FIG. 1) to establish secure connections with a policy server (e.g., access management server 135) utilizing dynamic channel communication. In some embodiments, the processes depicted in flowchart 400 may be implemented by the client device 110, the identity management system 117, and the security agent 130 of FIG. 1. Dynamic channel communication enables the security agent to provide the same secure access to resources regardless of the physical environment in which the agent and resources reside. For example, agents can be deployed on any device (e.g., server, set-top box, mobile phone, etc.) and anywhere (e.g., inside a company network, public cloud, private data center, etc.), which place restrictions on the communication channels available. The communication channels may be restricted to a specific port (e.g., port 80 and 443), direct communication may be blocked and thus the communication must go through a gateway/tunnel, or the device with the agent may support only a limited set of communication protocols. Dynamic channel communication allows the agent to discover and select the most secure channel without any human intervention. In certain embodiments, the security agent detects the current physical environment in which the security agent resides, identifies secure ports available to the security agent, and uses an identified secure port to securely communicate with a policy server that is external to the physical environment in which the security agent resides.

Prior to being configured in a new environment (e.g., a distributed environment), the security agent establishes a connection with the policy server through a conventional default port (e.g., a port 80, on a Web server or HTTP daemon, port 80 is the port that the server "listens to" or expects to receive from a Web client, assuming that the default was taken when the server was configured or set up) with standard or default security. Once the security agent is configured by the access manager server, the security agent automatically detects and changes to a more secure means of communication (optionally the most secure means of communication) than that of the standard or default security provided by the default port to communicate with the access management server (i.e., dynamic channel communication). The security of a means of communication refers to the ease with which a malicious actor (e.g., a hacker) can decrypt communications that are intended for someone else through eavesdropping (listening in). The dynamic channel communication occurs in a manner that is transparent to the application and/or the client. The security agent may provide the same secure access regardless of the physical environment in which the application and/or resource resides. For example, the security agent, using its context (e.g., the execution environment in which the security agent is operating, for example, agents can be deployed on any device (e.g., server, set-top box, mobile phone, etc.) and anywhere (e.g., inside a company network, public cloud, private data center, etc.)), analyzes various ports of communication to determine ports that may be accessible by the security agent to establish a secure connection with an external network (e.g., identity management system 117, which is external to the distributed environment). In some embodiments, the analysis of the various ports includes the agent using different operating parameters (e.g., capabilities enabled in the agent, network characteristics, hops to the destination, available ports such as communication paths, etc.) to determine a port that is suitable (e.g., offers the best performance and/or security). The security agent may then select the suitable port and use a protocol that corresponds to the selected port to establish a secure connection to the access manager server.

Each port in execution environments uses a communication protocol to establish host-to-host connectivity. Generally, each port establishes connectivity through a particular corresponding protocol. For example, port 80 typically corresponds to HTTP, while port 22 typically corresponds to secure shell (SSH). The security agent uses its context to identify not just the ports that are available but the specific protocol associated with each available port to enable connectivity regardless of the port ultimately selected. In various embodiments, the security agent initially attempts to use a proprietary port (e.g., a non-standard port) using a proprietary protocol to establish a connection. If a proprietary port is unavailable, the security agent connects to another available port. The security agent 130 may select available ports in a descending order from the most secure protocols to the least secure protocols, where proprietary protocols are the first to be selected if available.

In some embodiments, the security agent may be provided with a port mapping that identifies, for each port in the environment, a link between the port identifier and the corresponding protocol used by the port. The access manager server may send the port mapping to the security agent in the configuration file when the security agent is first initialized and configured. Alternatively, the port mapping may be a default data structure that is already present in the security agent. The port mapping may be advantageously stored as metadata by the security agent enabling an agent service to push updated metadata including updated ports, port identifiers, and/or protocols to the security agent at any time. While in some embodiments the security agent initially communicates over a conventional default port (e.g., port 80), the security agent may use the port mapping to efficiently select any port with a preferable, secure protocol.

Returning to FIG. 4, at step 405, an agent will connect with a policy server such as an access manager server (e.g., access manager server 135 of FIG. 1) through a default or standard port using a default or standard protocol. For example, the agent may establish a connection to the policy server using HTTP through port 80. The security agent is configured to work with the policy server to control access to a resource in a distributed environment, the policy server is located outside of the distributed environment, and as described with respect to FIG. 1, the policy server includes policies for controlling the access to the resource. In some embodiments, the agent will connect with the policy server through the default or standard port using the default or standard protocol upon the agent being registered. Registration occurs when the provisioning infrastructure registers the agent with an access manager as described with respect to step 210 of FIG. 2, or when the administrator provides the access manager with administrator credentials, acquires an access token from an authorization service, and registers the agent with an access manager as described with respect to step 325 of FIG. 3.

At step 410, once the connection with the policy server is established, the agent obtains a configuration file from the policy server such that the agent can initialize and determine the current physical environment in which the security agent resides. The configuration file includes contextual information regarding the agent's environment such that the agent may determine the current physical environment such as a distributed environment in which the security agent resides. The configuration file may be obtained by downloading the configuration file as described in accordance with step 225 of FIG. 2 or step 335 of FIG. 3. In some embodiments, the configuration file includes a port mapping (i.e., a mapping between port identifiers, ports within the agent's environment, and protocols used by the ports). The agent may store the port mapping in metadata associated with the agent for present and future reference. In alternative embodiments, the port mapping is stored in metadata associated with the agent prior to the agent obtaining the configuration file.

At step 415, the agent analyzes various ports of communication within the determined physical environment to identify ports that may be accessible by the agent to establish a secure connection with the policy server. In some embodiments, when a port mapping is not available, the analyzing includes determining all ports and the protocols associated with each port of the determined physical environment, identifying a subset of ports that are available, identifying a preferred port that is within the subset of ports and provides a more secure connection (optionally the most secure connection) than that of the default or standard port, and connecting to the policy server using the preferred port (e.g., a proprietary port) and a corresponding protocol (e.g., a proprietary protocol) to access the policies for controlling access to the resource. In some embodiments, the agent determines ports and protocols within the physical environment using a list of well-known ports within the configuration file that have been defined by standard groups and broadly adopted by customers. Using a preferred port and corresponding protocol, the agent has access to greater breadth of functionality to increase the security of the connection.

The preferred port and corresponding protocol may be identified by searching the subset of ports for a proprietary port that uses a proprietary protocol, and if a proprietary port is found then control moves to step 420 and the security agent connects to the policy server through the proprietary port. The proprietary port (e.g., port dynamic, 6021, 44442, etc.) is a non-standard port that uses a proprietary protocol (e.g., Oracle Access Protocol, Netpoint Access Protocol, SiteMinder Agent-Server protocol, etc.) to establish a secure connection with the policy server. In an instance where the subset of ports does not include a proprietary port, then control transfers to step 425 where the agent identifies one or more non-proprietary ports (e.g., port 115 or 190) that use non-proprietary protocols (e.g., Simple File Transfer Protocol (SFTP or Gateway Access Control Protocol) and are more secure (optionally the most secure connection) than the default or standard port used for the initial connection, and connects to the determined physical environment through one of the non-proprietary ports. Port to Protocol mappings have been defined by industry groups that have been broadly adopted. In some embodiments, the agent evaluates the non-proprietary ports to select a non-proprietary port with the most desirable non-proprietary protocol. For example, the agent may select the non-proprietary port associated with a non-proprietary protocol capable of providing a strong security protocol before selecting a port with a weaker security protocol. Protocol strength is its ability to withstand brute-force decryption of the data flowing on the wire by an eavesdropper. In some embodiments, in order for the agent to determine one port is more secure than another, the agent initiates a probe to confirm the security protocol works over the selected port. If the first selected protocol fails, the agent tries out all other protocols until the agent finds a port that works. Control then transfers to step 430 where, the agent listens for an agent service to push updated configuration metadata that may include an updated port mapping (e.g., according to step 230 of FIG. 2 or step 340 of FIG. 3).

In other embodiments, when a port mapping is available, the analyzing includes identifying a preferred port that is within the port mapping and provides a more secure connection (optionally the most secure connection) than that of the default or standard port, and connecting to the policy server using the preferred port (e.g., a proprietary port) and a corresponding protocol (e.g., a proprietary protocol) to access the policies for controlling access to the resource. Using a preferred port and corresponding protocol, the agent has access to greater breadth of functionality to increase the security of the connection.

The preferred port and corresponding protocol may be identified by searching the port mapping, and if a proprietary port is found then control moves to step 420 and the security agent connects to the determined physical environment through the proprietary port. The proprietary port (e.g., port dynamic, 6021, 44442, etc.) is a non-standard port that uses a proprietary protocol (e.g., Oracle Access Protocol, Netpoint Access Protocol, SiteMinder Agent-Server protocol, etc.) to establish a secure connection with the policy server. In an instance where the subset of ports does not include a proprietary port, then control transfers to step 425 where the agent searches the port mapping to identify one or more non-proprietary ports (e.g., port 115 or 190) that use non-proprietary protocols (e.g., Simple File Transfer Protocol (SFTP or Gateway Access Control Protocol) and are more secure (optionally the most secure connection) than the default or standard port used for the initial connection, and connects to the determined physical environment through one of the non-proprietary ports. In some embodiments, the agent evaluates the non-proprietary ports to select a non-proprietary port with the most desirable non-proprietary protocol. For example, the agent may select the non-proprietary port associated with a non-proprietary protocol capable of providing a strong security protocol before selecting a port with a weaker security protocol. Protocol strength is its ability to withstand brute-force decryption of the data flowing on the wire by an eavesdropper. In some embodiments, in order for the agent to determine one port is more secure than another, the agent initiates a probe to confirm the security protocol works over the selected port. If the first selected protocol fails, the agent tries out all other protocols until the agent finds a port that works. Control then transfers to step 430 where, the agent listens for an agent service to push updated configuration metadata that may include an updated port mapping (e.g., according to step 230 of FIG. 2 or step 340 of FIG. 3).

Returning to step 430, the agent listens for the agent service to push updated configuration information to the agent. An update to the configuration file may include an updated port mapping. Once the agent receives an updated port mapping, control returns to step 415 where the agent uses the updated port mapping to repeat the execution flow.

Figure 5:
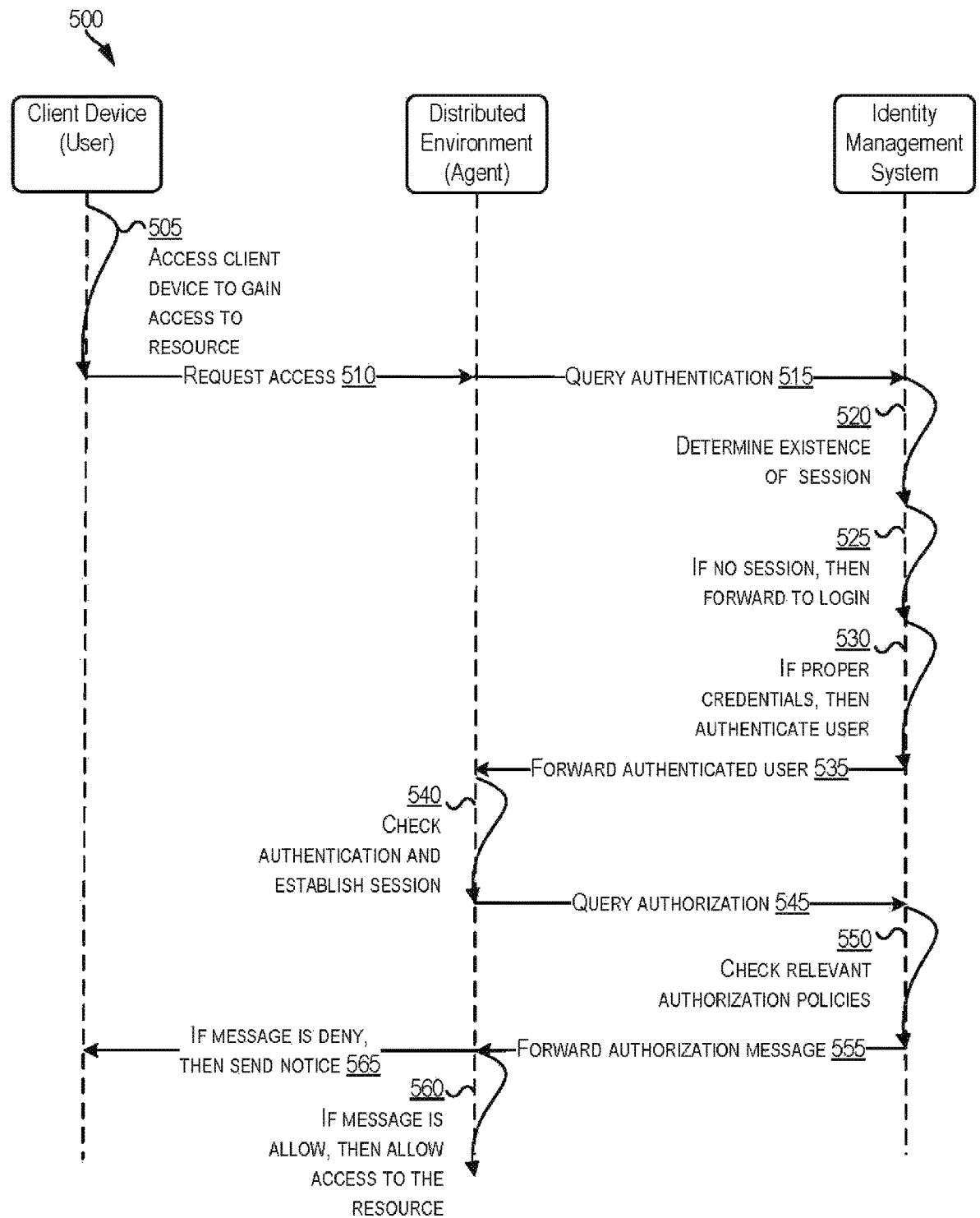
FIG. 5 illustrates a sequence diagram showing operations for requesting access to a resource in a distributed environment in accordance with various embodiments.

FIG. 5 is a sequence diagram 500 illustrating a process for requesting access to a resource in a distributed environment according to some embodiments. Specifically, FIG. 5 shows how client device 110, identity management system 117, and security agent 130 of FIG. 1 interact to control access to a resource in a distributed environment such as a cloud environment. Some examples described with reference to FIG. 5 are based on examples described with reference to FIG. 1.

In FIG. 5, an agent, such as one described above for resource 120, may control access to the resource 120. The following operations described for diagram 500 illustrate an example of access control implemented to grant or deny access of a user to a resource in a distributed environment. At 505, a client device may be accessed by a user to request access to a resource controlled by a distributed environment server. In response, at 510, the client device may send a request to the distributed environment server, which is intercepted by the agent assigned to protect the resource, or the request may be routed directly to the agent. At 515, the agent queries an access manager of the identity management system as to whether the resource is a protected resource requiring authentication of the user. The authentication query may be performed using the proprietary port and protocol or the most suitable alternative port and protocol, as described with respect to FIG. 4. If the requested resource is protected and requires authentication of the user, the access manager server determines at 520 whether any session exists for the user. Upon determining that no session has been established for the user, the user is forwarded at step 525 by the access manager server to a login service of the identity management system. The authentication service may request authentication credentials (e.g., user name/password, or the like) from the user. At step 530, the authentication service may authenticate the user upon receiving the proper authentication credentials by validating the credentials against those stored in a user directory or identity store.

Upon receiving the proper authentication credentials for the user, the access manager at step 535 forwards the user back to the agent. At 540, the agent checks the authentication, and establishes a session for the user upon authentication of the user. Once the session is started, at 545 the agent may process the original request for the resource by directing an authorization query to the access manager. The authorization query may be performed using the proprietary port and protocol or the most suitable alternative port and protocol, as described with respect to FIG. 4. At 550, the access manager checks relevant authorization policies for the resource to determine whether the user is authorized to access to the resource. At 555, the access manager responds to the agent with an allow or deny message based on the authorization policies. The response may be performed using the proprietary port and protocol or the most suitable alternative port and protocol, as described with respect to FIG. 4. Upon determining that the user is allowed access to the resource, at 565 the agent allows the request from the client device for access to the resource to go through and the user can access the resource at 570 on the distributed environment server via the client device. Upon determining that the user is denied access to the resource, at 575 the agent notifies the client that access to the resource for the user is not permitted.

Figure 6:
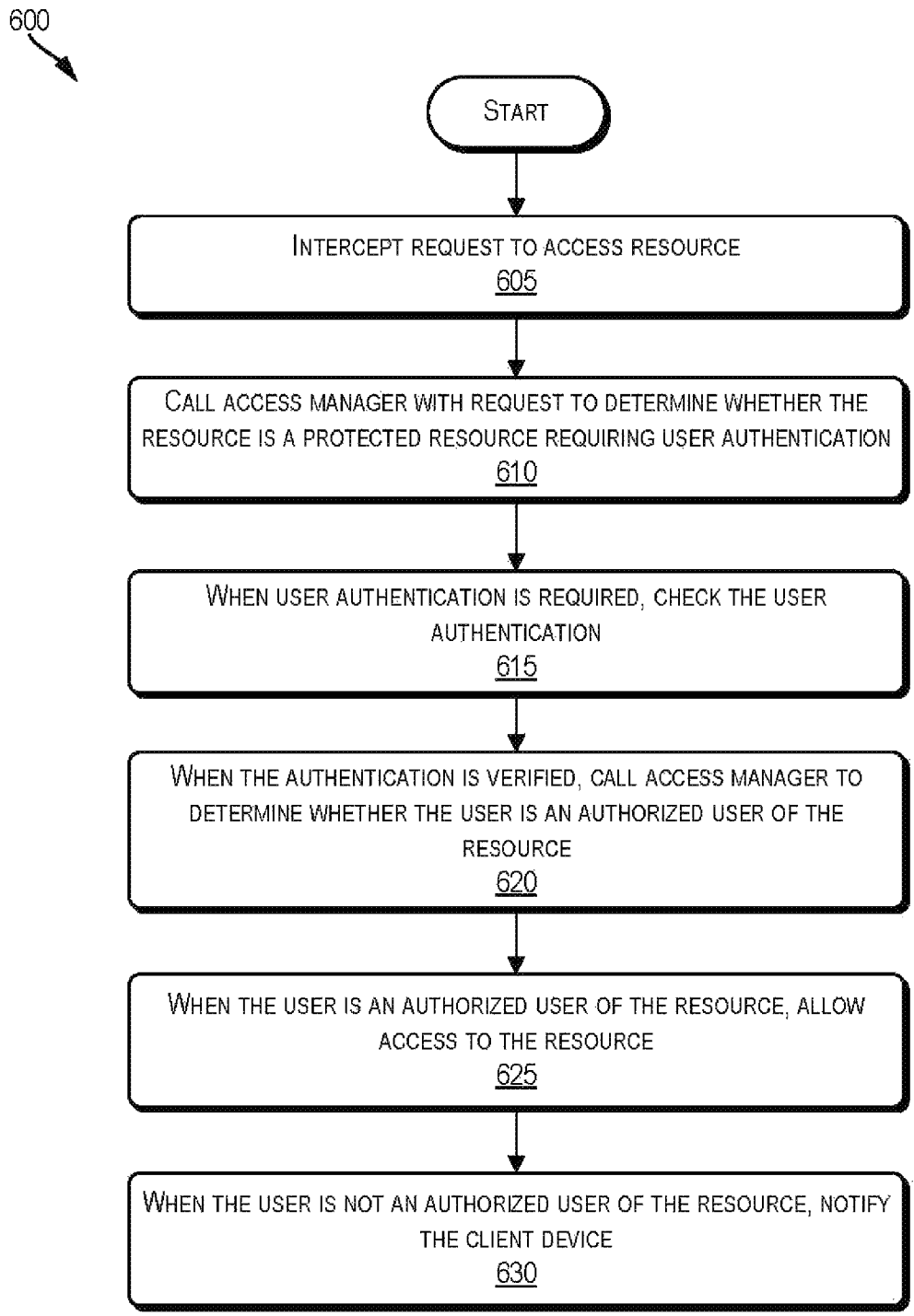
FIG. 6 depicts a flowchart illustrating a process for requesting access to a resource in a distributed environment in accordance with various embodiments.

FIG. 6 is a flowchart 600 illustrating a process for requesting access to a resource in a distributed environment according to some embodiments. In some embodiments, the processes depicted in flowchart 600 may be implemented by the client device 110, the identity management system 117, and the security agent 130 of FIG. 1.

At step 605, a request from a client device for access to a resource (e.g., resource 120 of FIG. 1) is intercepted by an agent (e.g., security agent 130 of FIG. 1). At step 610, the agent makes a call to an access manager (e.g., access manager server 135 of FIG. 1) and requests whether the resource is a protected resource requiring user authentication. The call may be performed using the proprietary port and protocol or the most suitable alternative port and protocol, as described with respect to FIG. 4. At step 615, when user authentication is required for access to the resource, the agent checks the authentication. At step 620, when the authentication is verified, the agent makes a call to the access manager and requests whether the user is authorized to access the resource. The call may be performed using the proprietary port and protocol or the most suitable alternative port and protocol, as described with respect to FIG. 4. At step 625, when the user is authorized to access the resource, the agent receives an allow message from the access manager and allows the user to access the resource. At step 630, when the user is not authorized to access the resource, the agent receives a deny message from the access manager and notifies the client device that the user is not an authorized user of the resource. The allow or deny message may be received using the proprietary port and protocol or the most suitable alternative port and protocol, as described with respect to FIG. 4.

Figure 7:
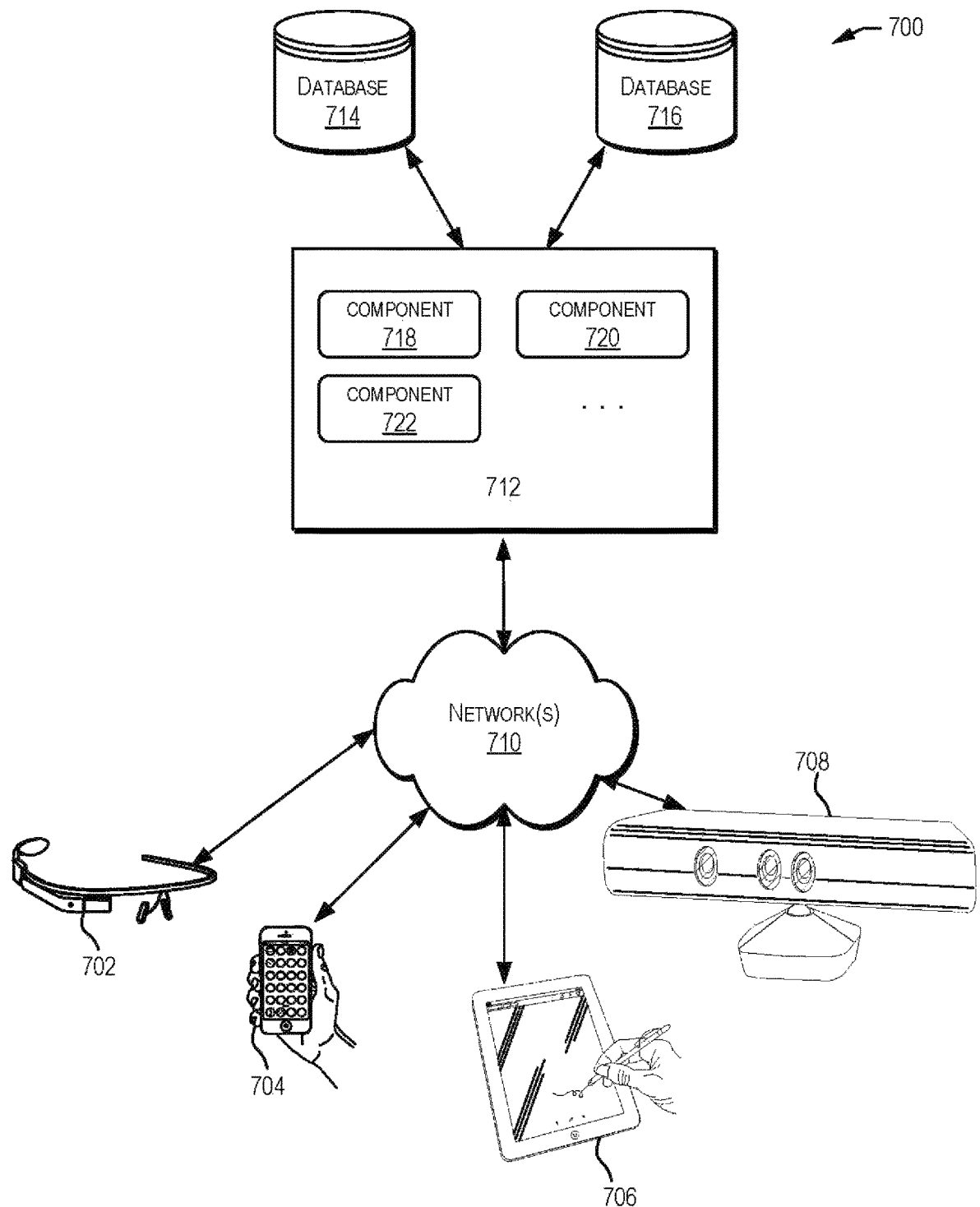
FIG. 7 illustrates a simplified diagram of a distributed system for implementing various embodiments.

FIG. 7 depicts a simplified diagram of a distributed system 700 for implementing an embodiment. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications such as services and applications that may manage session activity of SSO access in a distributed environment. In certain embodiments, server 712 may also provide other services or software applications can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 7 is thus one example of a distributed system for implementing an embodiment system and is not intended to be limiting.

Client computing devices 702, 704, 706, and/or 708 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 in FIG. 7 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used in various embodiments described herein. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 614 and 616 may include relational databases, such as databases provided by Oracle that are adapted to store, update, and retrieve data in response to SQL-formatted commands.

Figure 8:
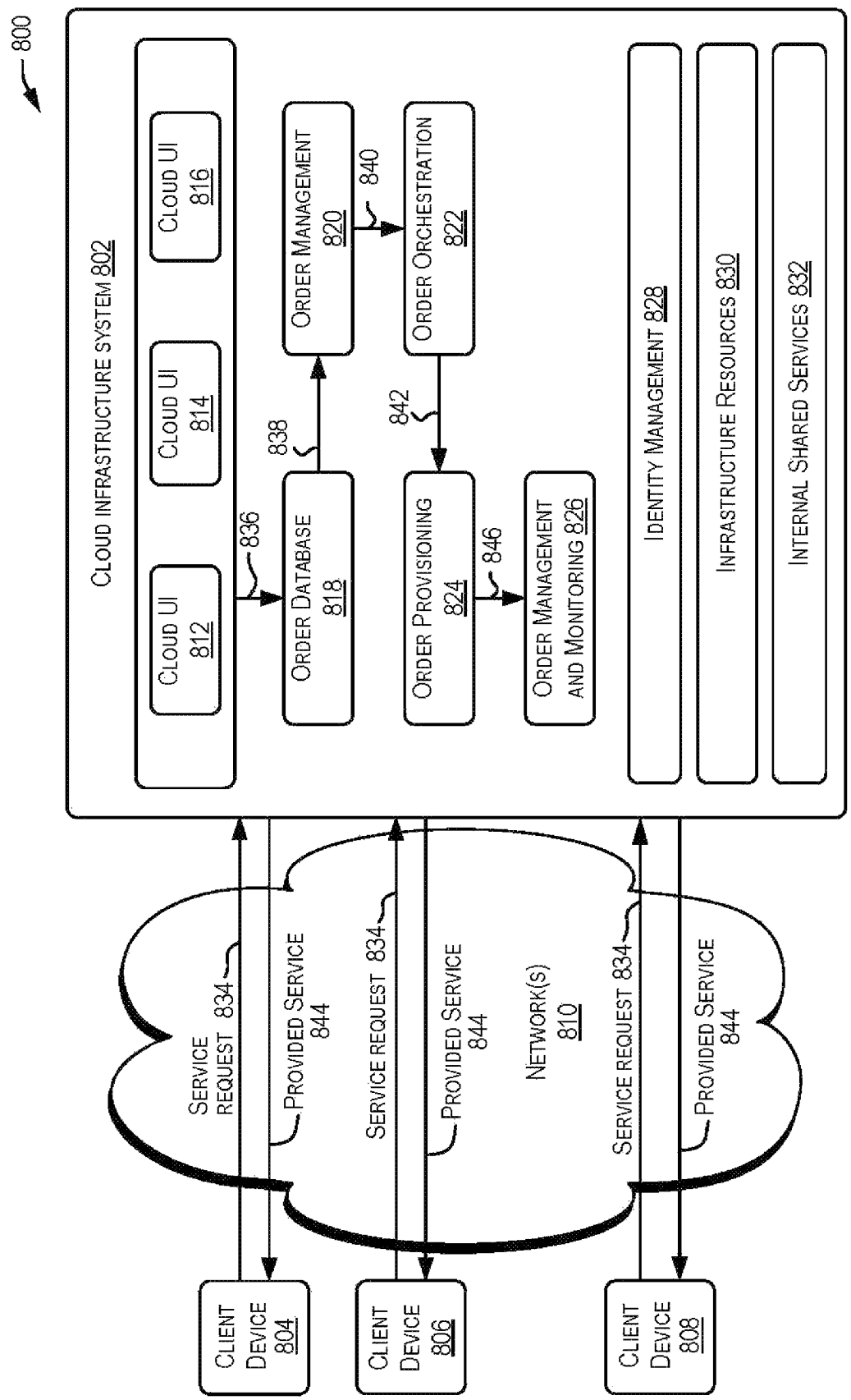
FIG. 8 illustrates a simplified block diagram of one or more elements of a system environment in which services may be offered as cloud services in accordance with various embodiments.

In some embodiments, a cloud environment may provide one or more services for managing session activity of SSO access in a distributed environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 702 that provides cloud services, including services for managing session activity of SSO access in a distributed environment. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system. In some other embodiments, cloud infrastructure system 802 may have more or fewer components than shown in the figure, may combine two or more components, or may have a different configuration or arrangement of components.

Client computing devices 804, 806, and 808 may be devices similar to those described above for client computing devices 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to managing session activity of SSO access across multiple data centers, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 702 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 830 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at step 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At step 836, the order information received from the customer may be stored in an order database 818. If this is a new order, a new record may be created for the order. In one embodiment, order database 818 can be one of several databases operated by cloud infrastructure system 818 and operated in conjunction with other system elements.

At step 838, the order information may be forwarded to an order management module 820 that may be configured to perform billing and accounting functions related to the order, such as verifying the order, and upon verification, booking the order.

At step 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at step 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At step 844, once the services and resources are provisioned, a notification may be sent to the subscribing customers indicating that the requested service is now ready for use. In some instance, information (e.g. a link) may be sent to the customer that enables the customer to start using the requested services.

At step 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
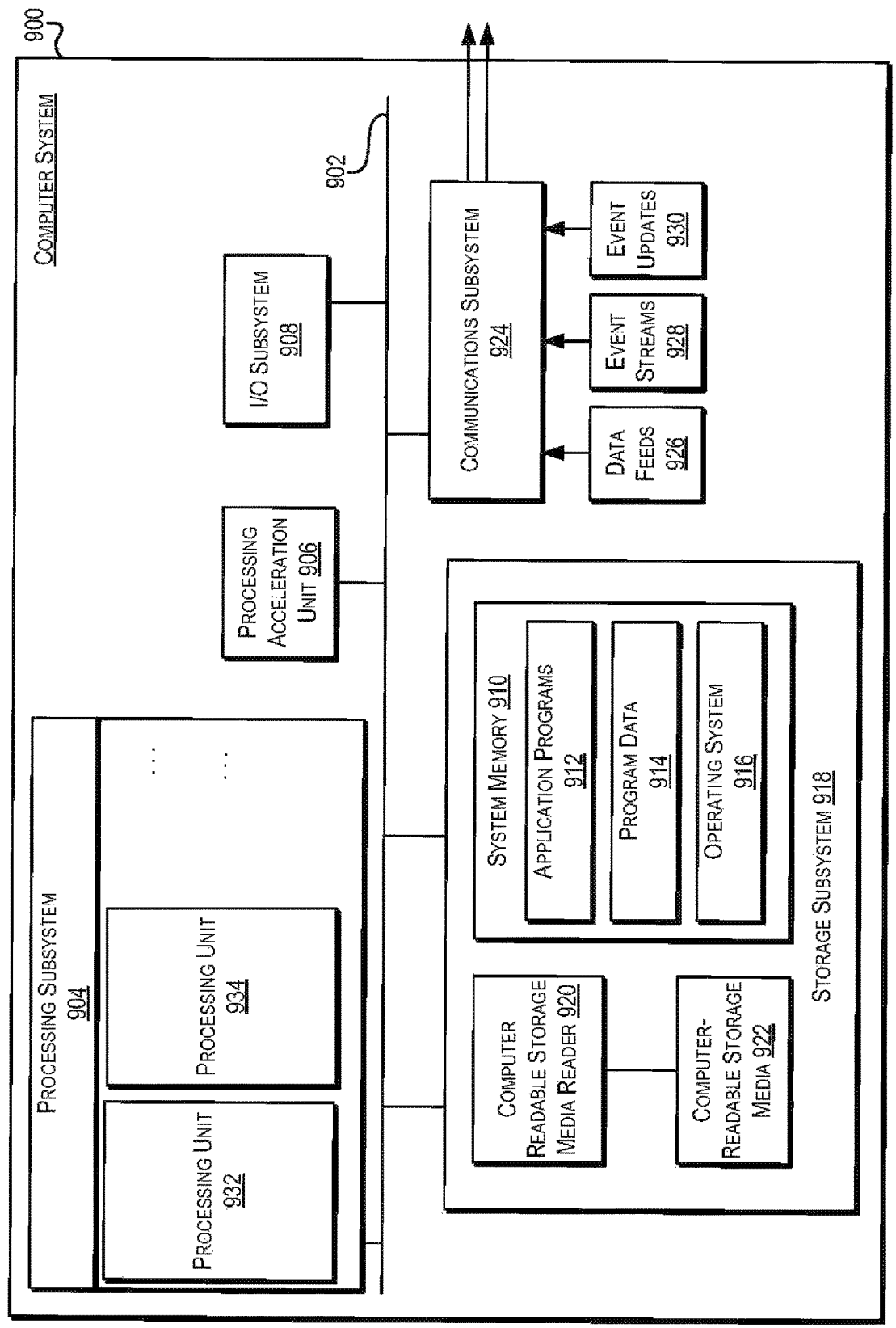
FIG. 9 illustrates an exemplary computer system that may be used to implement certain elements according to various embodiments.

FIG. 9 illustrates an exemplary computer system 900 that may be used to implement various embodiments described herein. In some embodiments, computer system 900 may be used to implement any of the various servers and computer systems described above. As shown in FIG. 9, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for managing session activity of SSO access in a distributed environment.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used.

Storage subsystem 918 may include one or more non-transitory memory devices, including volatile and non-volatile memory devices. As shown in FIG. 9, storage subsystem 918 includes a system memory 910 and a computer-readable storage media 922. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 800.

In certain embodiments, storage subsystem 900 may also include a computer-readable storage media reader 820 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client computing devices via the Internet for receiving and sending information from and to the client computing devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the invention. The modifications include any relevant combination of the disclosed features. The embodiments described herein are not restricted to operation within certain specific data processing environments, but are free to operate within a plurality of data processing environments. Additionally, although certain embodiments have been described using a particular series of transactions and steps, it should be apparent to those skilled in the art that the scope of such embodiments is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of such embodiments. The various embodiments described herein may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    upon start-up of a physical environment in which a security agent resides, initializing, by the security agent, using a bootstrap configuration packaged in a file, wherein the file is provided to the security agent by an identity management system upon registration of the security agent with a policy server of the identity management system, wherein the security agent resides outside of the identity management system, wherein the policy server includes a policy for controlling access to a resource in a distributed environment server, wherein the registration includes issuance of an access token to the security agent, which creates a trust mechanism between the security agent and the identity management system, and wherein the file further includes security information that allows the security agent to subsequently connect to the identity management system in a secure manner;
    connecting, by the security agent, to the policy server of the identity management system through a default port using a default protocol based on the security information and the trust mechanism created between the security agent and the identity management system;
    obtaining, by the security agent, a configuration file from the policy server using the default port and the default protocol, wherein includes contextual information regarding the physical environment of the security agent such that the security agent can initialize and determine the physical environment in which the security agent resides, and wherein the configuration file or metadata associated with the security agent comprises a port mapping, which includes a mapping between port identifiers, ports of communication within the physical environment, and protocols used by the ports;
    analyzing, by the security agent, the ports of communication within the physical environment to identify a preferred port that is available for connection to the policy server, wherein the preferred port provides a more secure connection than that of the default port;
    receiving, by the security agent, a request from a user for access to the resource provided in the distributed environment server;
    connecting, by the security agent, to the policy server through the preferred port using a corresponding protocol to delegate authentication tasks to the identity management system and work with the policy server to access the policy for controlling the access to the resource;
    requesting, by the security agent, a determination be made by the policy server as to whether authentication of the user is required for access to the resource, wherein the request is sent from the security agent to the policy server via the preferred port;
    checking, by the security agent, the authentication of the user when the authentication of the user is required for access to the resource;
    requesting, by the security agent, a determination be made by the policy server as to whether the user is authorized to access the resource when the authentication of the user is verified, wherein the request is sent from the security agent to the policy server via the preferred port; and allowing, by the security agent, the user access to the resource when the user is authorized to access the resource.

2. The method of claim 1, wherein the analyzing includes:
identifying, by the security agent, a subset of ports that are available from all the ports of communication; and
identifying, by the security agent, the preferred port that is within the identified subset of ports and provides the more secure connection than that of the default port.

3. The method of claim 2, wherein the identifying the preferred port includes searching, by the security agent, the subset of ports for a proprietary port that uses a proprietary protocol; and
when the proprietary port is identified in the subset of ports, connecting, by the security agent, to the policy server through the proprietary port using the proprietary protocol to access the policies for controlling the access to the resource.

4. The method of claim 3, wherein when the proprietary port is not identified in the subset of ports, searching, by the security agent, the subset of ports for a non-proprietary port that uses a non-proprietary protocol and provides the more secure connection than that of the default port; and
connecting, by the security agent, to the policy server through the non-proprietary port using the non-proprietary protocol to access the policies for controlling the access to the resource.

5. The method of claim 1, wherein the analyzing includes identifying, by the security agent, the preferred port using the port mapping.

6. The method of claim 5, wherein the identifying the preferred port includes searching, by the security agent, the port mapping for a proprietary port that uses a proprietary protocol;
when the proprietary port is identified in the port mapping, connecting, by the security agent, to the policy server through the proprietary port using the proprietary protocol to access the policies for controlling the access to the resource;
when the proprietary port is not identified in the port mapping, searching, by the security agent, the port mapping for a non-proprietary port that uses a non-proprietary protocol and provides the more secure connection than that of the default port; and
connecting, by the security agent, to the policy server through the non-proprietary port using the non-proprietary protocol to access the policies for controlling the access to the resource.

7. A system comprising:
one or more processors and non-transitory machine readable storage medium;
a distributed environment server that includes a resource;
a policy server of an identity management system that includes one or more policies for controlling access to the resource and resides outside of the distributed environment server;
a security agent that resides inside a physical environment and outside of the identity management system, and the security agent is configured to intercept requests for access to the resource from a local application and work with the policy server to control access to the resource;
program instructions to, upon start-up of the physical environment in which the security agent resides, initialize the security agent using a bootstrap configuration packaged in a file, wherein the file is provided to the security agent by the identity management system upon registration of the security agent with the policy server of the identity management system, wherein the registration includes issuance of an access token to the security agent, which creates a trust mechanism between the security agent and the identity management system, and wherein the file further includes security information that allows the security agent to subsequently connect to the identity management system in a secure manner;
program instructions to connect the security agent to the policy server through a default port using a default protocol based on the security information and the trust mechanism created between the security agent and the identity management system;
program instructions to obtain a configuration file from the policy server using the default port and the default protocol, wherein the configuration file includes contextual information regarding the physical environment of the security agent such that the security agent can initialize and determine the physical environment in which the security agent resides, and wherein the configuration file or metadata associated with the security agent comprises a port mapping, which includes a mapping between port identifiers, ports of communication within the physical environment, and protocols used by the ports;
program instructions to analyze the ports of communication within the physical environment to identify a preferred port that is available for connection to the policy server, wherein the preferred port provides a more secure connection than that of the default port;
program instruction to receive a request from a user for access to the resource provided in the distributed environment server;
program instructions to connect the security agent to the policy server through the preferred port using a corresponding protocol to delegate authentication tasks to the identity management system and work with the policy server to access the one or more policies for controlling the access to the resource;
program instruction to request a determination be made by the policy server as to whether authentication of the user is required for access to the resource, wherein the request is sent from the security agent to the policy server via the preferred port;
program instruction to check the authentication of the user when the authentication of the user is required for access to the resource;
program instruction to request a determination be made by the policy server as to whether the user is authorized to access the resource when the authentication of the user is verified, wherein the request is sent from the security agent to the policy server via the preferred port; and
program instruction to allow the user access to the resource when the user is authorized to access the resource,
wherein the program instructions are stored on the non-transitory machine readable storage medium for execution by the one or more processors.

8. The system of claim 7, wherein the analyzing includes:
identifying a subset of ports that are available from all the ports of communication; and
identifying the preferred port that is within the identified subset of ports and provides the more secure connection than that of the default port.

9. The system of claim 8, wherein the identifying the preferred port includes searching the subset of ports for a proprietary port that uses a proprietary protocol; and when the proprietary port is identified in the subset of ports, connecting to the policy server through the proprietary port using the proprietary protocol to access the policies for controlling the access to the resource.

10. The system of claim 9, wherein when the proprietary port is not identified in the subset of ports, searching the subset of ports for a non-proprietary port that uses a non-proprietary protocol and provides the more secure connection than that of the default port; and connecting to the policy server through the non-proprietary port using the non-proprietary protocol to access the policies for controlling the access to the resource.

11. A non-transitory machine readable storage medium having instructions stored thereon that when executed by one or more processors cause the one or more processors to perform a method comprising:

upon start-up of a physical environment in which a security agent resides, initializing the security agent using a bootstrap configuration packaged in a file, wherein the file is provided to the security agent by an identity management system upon registration of the security agent with a policy server of the identity management system, wherein the security agent resides outside of the identity management system, wherein the policy server includes one or more policies for controlling access to a resource in a distributed environment server, wherein the registration includes issuance of an access token to the security agent, which creates a trust mechanism between the security agent and the identity management system, and wherein the file further includes security information that allows the security agent to subsequently connect to the identity management system in a secure manner;

connecting the security agent to the policy server of the identity management system through a default port using a default protocol based on the security information and the trust mechanism created between the security agent and the identity management system;

obtaining a configuration file from the policy server using the default port and the default protocol, wherein the configuration file includes contextual information regarding the physical environment of the security agent such that the security agent can initialize and determine the physical environment in which the security agent resides, and wherein the configuration file or metadata associated with the security agent comprises a port mapping, which includes a mapping between port identifiers, ports of communication within the physical environment, and protocols used by the ports;

analyzing the ports of communication within the physical environment to identify a preferred port that is available for connection from the security agent to the policy server, wherein the preferred port provides a more secure connection than that of the default port;

receiving a request from a user for access to the resource provided in the distributed environment server;

connecting to the policy server through the preferred port using a corresponding protocol to access the one or more policies for controlling the access to the resource;

requesting a determination be made by the policy server as to whether authentication of the user is required for access to the resource, wherein the request is sent from the security agent to the policy server via the preferred port;

checking the authentication of the user when the authentication of the user is required for access to the resource;

requesting a determination be made by the policy server as to whether the user is authorized to access the resource when the authentication of the user is verified, wherein the request is sent from the security agent to the policy server via the preferred port; and allowing the user access to the resource when the user is authorized to access the resource.

12. The non-transitory machine readable storage medium of claim 11, the method further comprises prior to connecting to the policy server through the preferred port, obtaining a configuration file from the policy server using the default port and a default protocol such that the security agent can initialize and determine the physical environment in which the security agent resides.

13. The non-transitory machine readable storage medium of claim 12, wherein the analyzing includes:

determining all ports and corresponding protocols of the physical environment;

identifying a subset of ports that are available from all the determined ports; and identifying the preferred port that is within the identified subset of ports and provides the more secure connection than that of the default port.

14. The non-transitory machine readable storage medium of claim 13, wherein the identifying the preferred port includes searching the subset of ports for a proprietary port that uses a proprietary protocol; and when the proprietary port is identified in the subset of ports, connecting to the policy server through the proprietary port using the proprietary protocol to access the policies for controlling the access to the resource.

15. The non-transitory machine readable storage medium of claim 14, wherein when the proprietary port is not identified in the subset of ports, searching the subset of ports for a non-proprietary port that uses a non-proprietary protocol and provides the more secure connection than that of the default port; and connecting to the policy server through the non-proprietary port using the non-proprietary protocol to access the policies for controlling the access to the resource.

16. The non-transitory machine readable storage medium of claim 11, wherein the analyzing includes identifying the preferred port using the port mapping, and the identifying the preferred port includes searching the port mapping for a proprietary port that uses a proprietary protocol;

when the proprietary port is identified in the port mapping, connecting to the policy server through the proprietary port using the proprietary protocol to access the policies for controlling the access to the resource;

when the proprietary port is not identified in the port mapping, searching the port mapping for a non-proprietary port that uses a non-proprietary protocol and provides the more secure connection than that of the default port; and connecting to the policy server through the non-proprietary port using the non-proprietary protocol to access the policies for controlling the access to the resource.

* * * * *

UNITED STATES PATENT AND TRADEMARK OFFICE
CERTIFICATE OF CORRECTION

PATENT NO. : 10,505,982 B2  
APPLICATION NO. : 15/331211  
DATED : December 10, 2019  
INVENTOR(S) : Motukuru et al.

Page 1 of 1

It is certified that error appears in the above-identified patent and that said Letters Patent is hereby corrected as shown below:

On the Title Page

On page 3, Column 2, under Other Publications, Line 40, delete "Identify:" and insert -- Identity: --, therefor.

In the Specification

In Column 7, Line 56, delete "vachine)" and insert -- machine). --, therefor.

In Column 25, Line 21, delete "9is" and insert -- 9 is --, therefor.

In the Claims

In Column 26, Line 31, in Claim 1, delete "wherein includes" and insert -- wherein the configuration file includes --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*